(12) United States Patent
Suzuki et al.

(10) Patent No.: US 6,505,001 B1
(45) Date of Patent: Jan. 7, 2003

(54) ROTOR STRUCTURE OF SPINDLE MOTOR

(75) Inventors: Yuzuru Suzuki, Shizuoka-ken (JP); Taketoshi Ohyashiki, Shizuoka-ken (JP); Naoyuki Harada, Shizouka-ken (JP)

(73) Assignee: Minebea Co. Ltd., Nagano (JP)

( * ) Notice: Subject to any disclaimer, the term of this patent is extended or adjusted under 35 U.S.C. 154(b) by 0 days.

(21) Appl. No.: 08/968,495

(22) Filed: Nov. 12, 1997

(30) Foreign Application Priority Data

Nov. 13, 1996 (JP) ............................................. 8-301510

(51) Int. Cl.⁷ ............................ G11B 23/00; G11B 25/00
(52) U.S. Cl. ...................................................... 396/266
(58) Field of Search ................................ 369/266, 270, 369/271; 360/98.07, 99.04, 99.08

(56) References Cited

U.S. PATENT DOCUMENTS

| | | | | |
|---|---|---|---|---|
| 4,072,315 A | * | 2/1978 | Tsujihara et al. | ............... 274/1 |
| 4,435,799 A | * | 3/1984 | Kirschner | ................... 369/77.2 |
| 5,128,818 A | * | 7/1992 | Koizumi et al. | ......... 360/99.04 |
| 5,193,084 A | * | 3/1993 | Christiaens | ................. 369/258 |
| 5,327,417 A | * | 7/1994 | Tanaka et al. | ............... 369/219 |
| 5,610,889 A | * | 3/1997 | Ishii et al. | .................. 369/75.2 |
| 5,646,934 A | * | 7/1997 | Mizuno et al. | .............. 369/290 |

* cited by examiner

Primary Examiner—Dung C. Dinh
Assistant Examiner—Tod Kupstas
(74) Attorney, Agent, or Firm—Staas & Halsey LLP

(57) ABSTRACT

In a rotor structure of a spindle motor, an underside of a turntable and a top surface of a rotary yoke are integrated with each other by insert molding to eliminate an air gap therebetween in prior arts to thereby allow a stator assembly within the rotary yoke to increase its thickness and also enhance the rigidity of the integrated components while dimensions of the motor remaining unchanged, moreover, simultaneous integration with any components of a rotary shaft, a chucking magnet and a rotary magnet being advantageous in reduction of the assembling steps.

9 Claims, 4 Drawing Sheets

ROTOR STRUCTURE OF SPINDLE MOTOR

BACKGROUND OF THE INVENTION

1. Field of the Invention

The present invention relates to an improved rotor structure of a spindle motor intended for an optical disk such as a CD-ROM.

2. Description of the Prior Art

In response to a demand for increase in the motor rotational speed attendant on the recent high-speed equipment, the endeavor to enhance the motor performances has almost reached its limit and one of the remaining problems lies in removing any dead space from the motor, that is, effective utilization of the motor space. By the way, the conventional spindle motor for an optical disk comprises a turntable, a rotor yoke and a shaft which are separate components, with the turntable and the rotor yoke being assembled together by caulking, and with the turntable and the shaft being assembled together by press fitting. Such an example is shown FIG. 7.

FIG. 7 is a sectional view of such a conventional spindle motor.

As is apparent from FIG. 7, at the center of a turntable 12 made of a metal such as brass, a holder 41 is press fitted onto a shaft 15. The holder 41 adhesively holds a chucking magnet 10 for attracting an optical disk 1. On the outer periphery of the holder 41, a guide 42 is retained by a spring 43 in an axially displaceable manner. The guide 42 serves to guide the optical disk 1 toward the center of the turntable 12.

A rubber ring sheet 11 is adhered to the outer periphery of the turntable 12. The rubber ring sheet 11 serves as a slip resistant material for the optical disk 1. A rotor yoke 13 is joined by caulking to the underside of the turntable 12 in such a manner that the rotor yoke 13 is coaxial with the turntable 12. It is natural that a magnetized rotor magnet 14 be adhered to the rotor yoke 13. Also, as is apparent from FIG. 7, a gap is defined between the turntable 12 and the rotor yoke 13 to provide an uneven contour.

The spindle motor for an optical disk needs a high precision, and hence each of the components used therein also requires a high precision. To this end, each component needs a high rigidity. To enhance the rigidity, the dimensions of the components are enlarged in a degree. As a result, a space available for the motor to provide a magnetic circuit is reduced, resulting in an inefficient utilization of the space. Each of the components needs to be manufactured at a high precision, so that it is impossible to reduce the production cost, leading to a high price. Thus, the conventional spindle motor has failed in not only obtaining desired motor performances but also in complying with the demand for a reduction in cost.

SUMMARY OF THE INVENTION

The present invention was conceived in view of the above circumstances. It is therefore an object of the present invention to provide a rotor structure capable of achieving an increase in the power output, an improvement in the productivity and a reduction in the production cost, without any need to change the external dimensions of the motor.

Measures to increase the power output without changing the dimensions of the motor include eliminating the gaps which have been formed on the underside of the turntable and on the top of the rotor yoke and reducing the unevenness on the outer side surface to extend the height of the rotor yoke by the distance of the gaps and to lengthen the rotor magnet to enhance the capability of the magnet, while simultaneously increasing the number of magnetic plates for the stator yokes inside the rotor yoke to thereby enhance the capability of the magnetic circuit of the stator corresponding to the magnet, thus achieving a high power output.

Furthermore, the material of the turntable can be resin in place of the metal which has hitherto been used, to thereby reduce the material cost. The rotor yoke and the shaft are integrated with the turntable by insert molding. The chucking magnet, the rotor yoke and the shaft may be integrated with the turntable by insert molding, to provide a high-performance rotor at a lower cost and having a high productivity as well as allowing a reduction in size of the motor.

The rotor yoke and the shaft are integrally insert molded into any one or a combination of the turntable, the rotor magnet and the chucking magnet which may also be formed from a rare plastic magnet material. Moreover, the chucking magnet may be provided with a back yoke to achieve an improvement in the chucking properties, thus realizing a high-speed and low-cost spindle motor.

DESCRIPTION OF THE PREFERRED EMBODIMENTS

Figure 1:
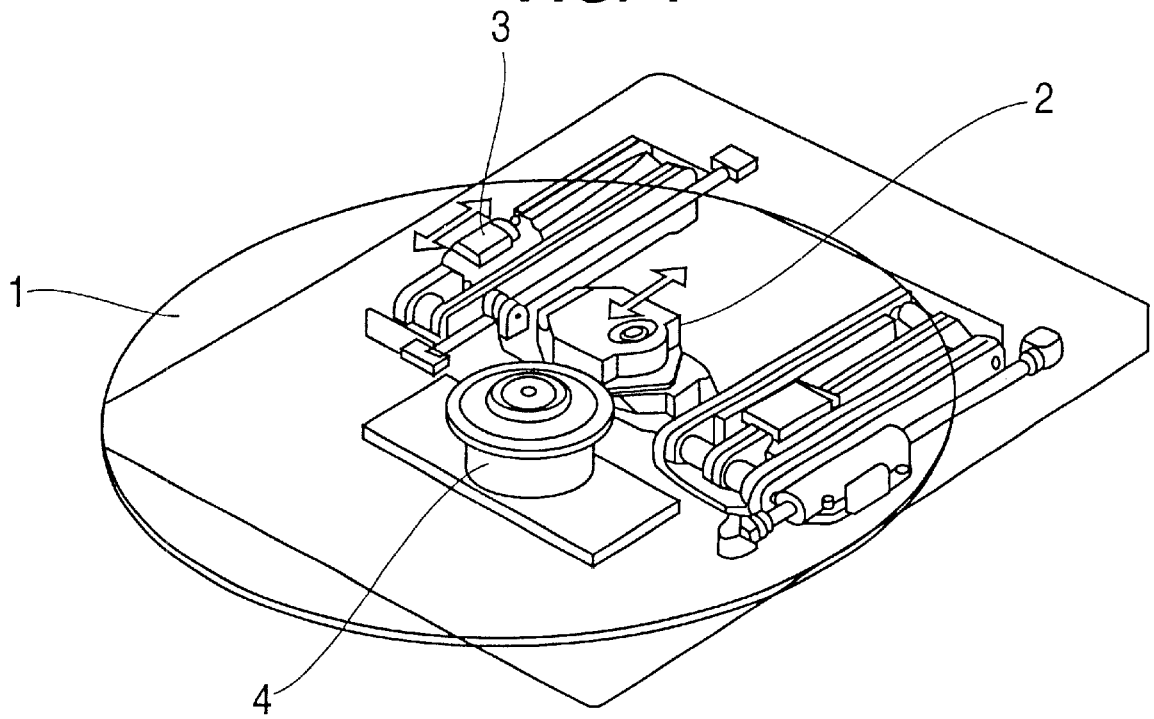
FIG. 1 shows a perspective view of a CD-ROM drive with a spindle motor.
Figure 2:
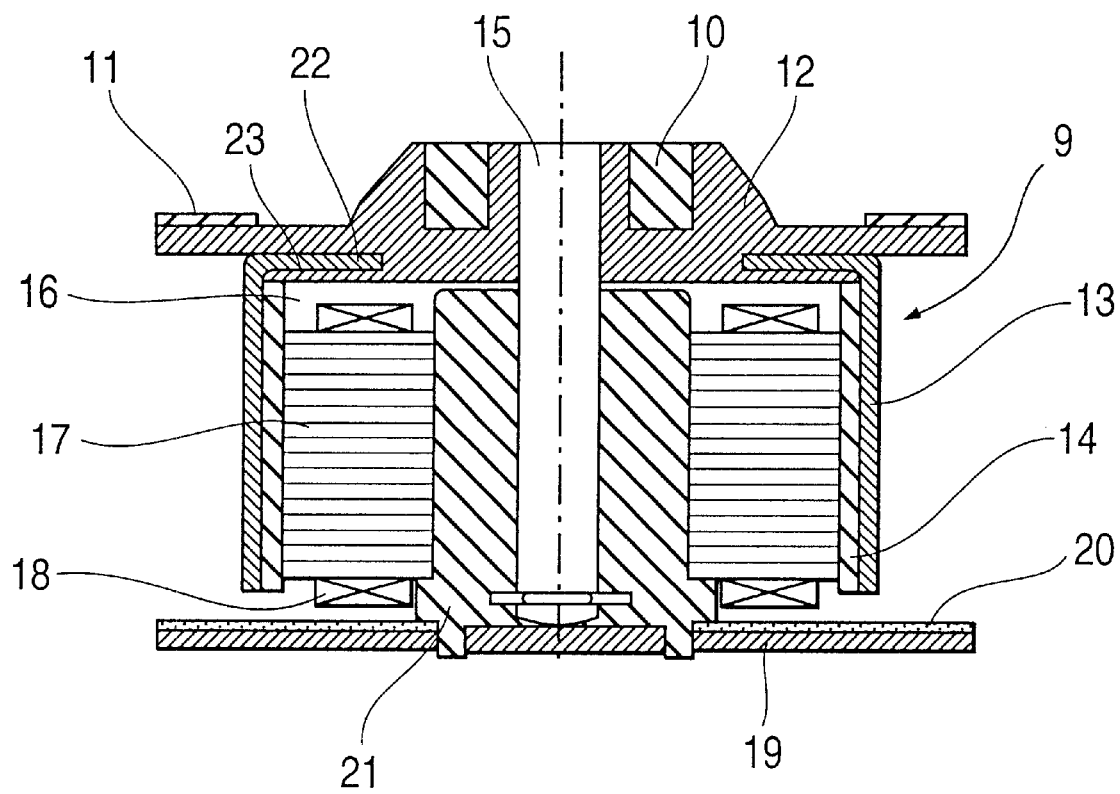
FIG. 2 is a cross sectional view of a rotor structure in the first embodiment of the invention.

An exemplary embodiment of the present invention will now be described with reference to the accompanying drawings. FIG. 1 is a conceptual diagram illustrating a configuration of a CD-ROM drive provided with a spindle motor with a rotor structure of the present invention. The CD-ROM drive comprises an optical disk 1 which is disposed on top of a spindle motor 4 and is turned thereby, and an optical head 2 located below the optical disk 1 for radially scanning the optical disk 1 by means of an actuator 3 to reproduce desired information. FIG. 2, showing the first embodiment, is a longitudinal sectional view illustrating a configuration of the spindle motor 4 shown in FIG. 1.

A turntable 12 is made of a resin, and a rotor yoke 13 and a shaft 15 are integrated with the turntable 12 by insert molding. Then, in order to secure the precision and rigidity of the turntable 12 and to ensure improved motor performances, the rotor yoke 13 is designed to occupy a space between the turntable 12 and motor yoke 13 which has hitherto been formed, to thereby reduce the unevenness on the outer surface. The rotor yoke 13 is made of a soft magnetic metal plate which has been punched into an inverted cup-like shape with the flat bottom 23 having a circular opening 22 at its center.

Then, the turntable 12 has at its center a chucking magnet 10 which has already been magnetized. The chucking magnet 10 may be adhesively secured to the turntable 12 or may be integrated with the turntable 12 at the time of insert molding. A ring sheet 11 having a high friction coefficient is adhered to the outer periphery of the turntable 12 in order to prevent any slipping relative to the optical disk 1. The inner peripheral surface of the rotor yoke 13 is provided with a rotor magnet 14 which has been magnetized to a predetermined level and adhesively secured thereto, to constitute a rotor assembly 9.

Herein, the resin to be insert molded may be plastic magnet material containing magnetic particles so as to enable the chucking magnet 10 and the rotor magnet 14 to be made at one time through a single process to thereby secure a further simplicity of the process as well as the high precision. It is to be appreciated that the magnetic particles could be appropriately selected from a group consisting of ferrite and rare earth magnet in response to the requirements of the motor.

Figure 3:
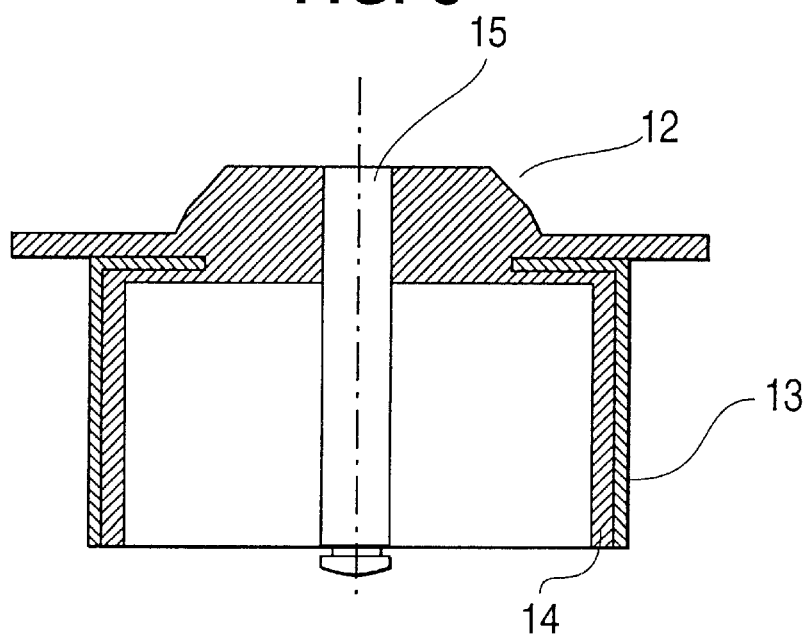
FIG. 3 is a cross sectional view of a rotor structure in the second embodiment of the invention.

FIG. 3 illustrates in section a turntable 12 made of Nd—F—B rare earth plastic magnet in the second embodiment. In this method, the chucking magnet 10 and the rotor magnet 14 are formed integrally with the turntable 12 and of the same material therewith, to thereby achieve a substantial curtailment of the processes.

Figure 4:
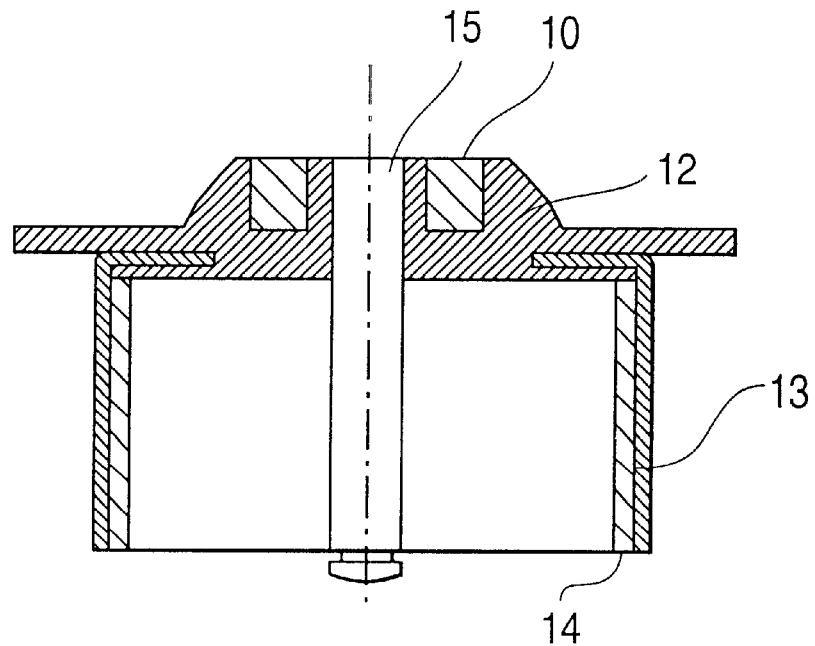
FIG. 4 is a cross sectional view of a rotor structure in the third embodiment of the invention.

FIG. 4 illustrates, according to the third embodiment, in section a turntable 12 for a ultra-high times speed CD-ROM, with which there are integrated by insert molding the shaft 15, the rotor yoke 13 as well as the chucking magnet 10 for firmly attracting the optical disk. Such a configuration will allow a rare earth sintered magnet having a strong attracting force to be selected as the material of the chucking magnet 10 while simultaneously providing a firmer fixation relative to the turntable 12, to thereby ensure a chucking structure having a high reliability free from any backlash of the chucking magnet 10 due to the repetition of chucking of the optical disk 1.

Figure 5:
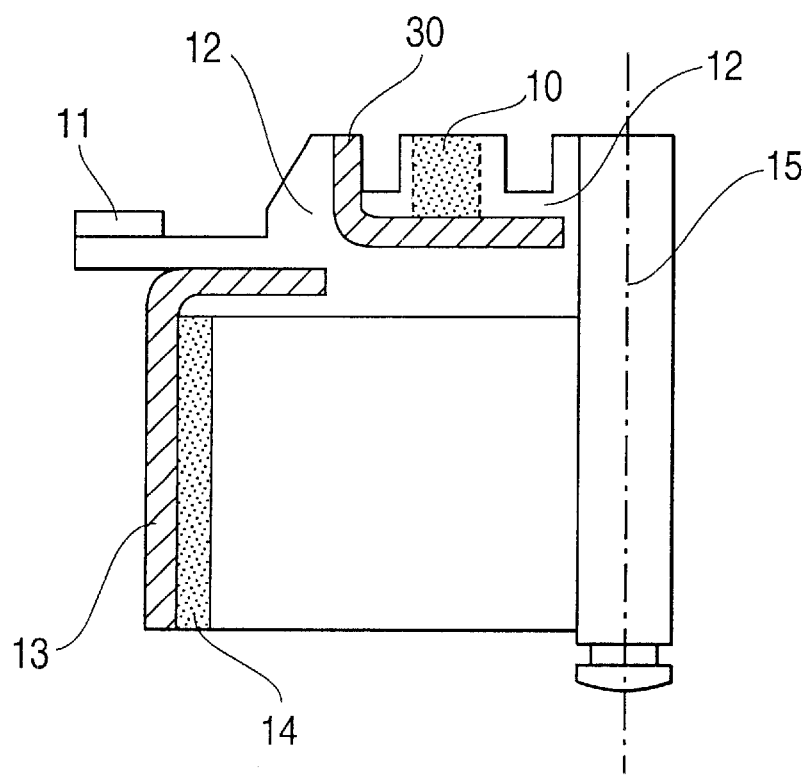
FIG. 5 is a cross sectional view of a rotor structure in the fourth embodiment of the invention.

FIG. 5 illustrates as the fourth embodiment an improved magnetic circuit to further increase the attracting force of the chucking magnet 10, in which the chucking magnet 10 is surrounded by a back yoke 30 made of a soft magnetic material such as a cold rolled steel plate which has been drawn into a cup-like shape, the back yoke 30 being integrally insert molded into the turn table 12 through the plastic magnet.

Figure 6:
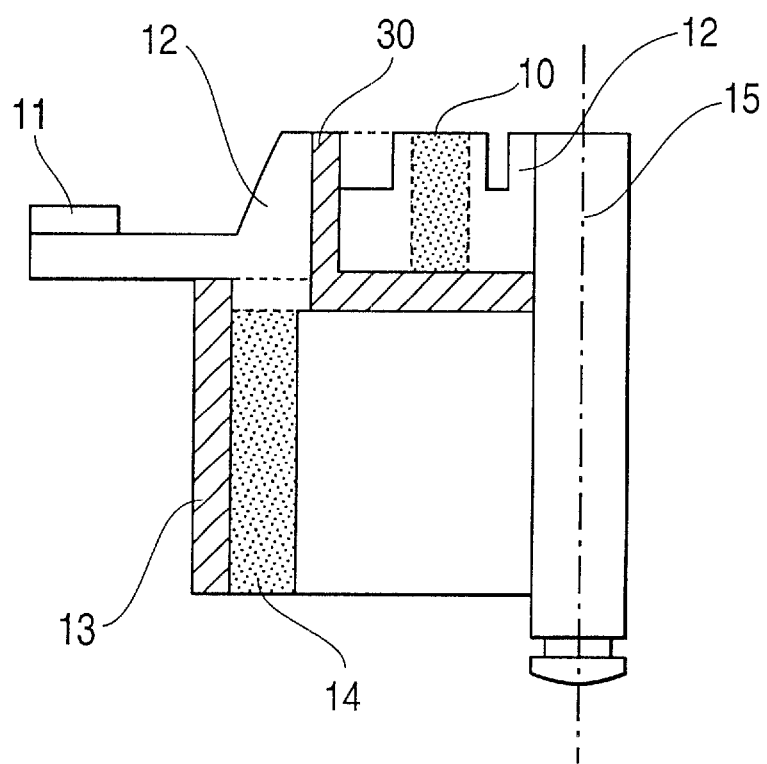
FIG. 6 is a cross sectional view of a rotor structure in the fifth embodiment of the invention.
Figure 7:
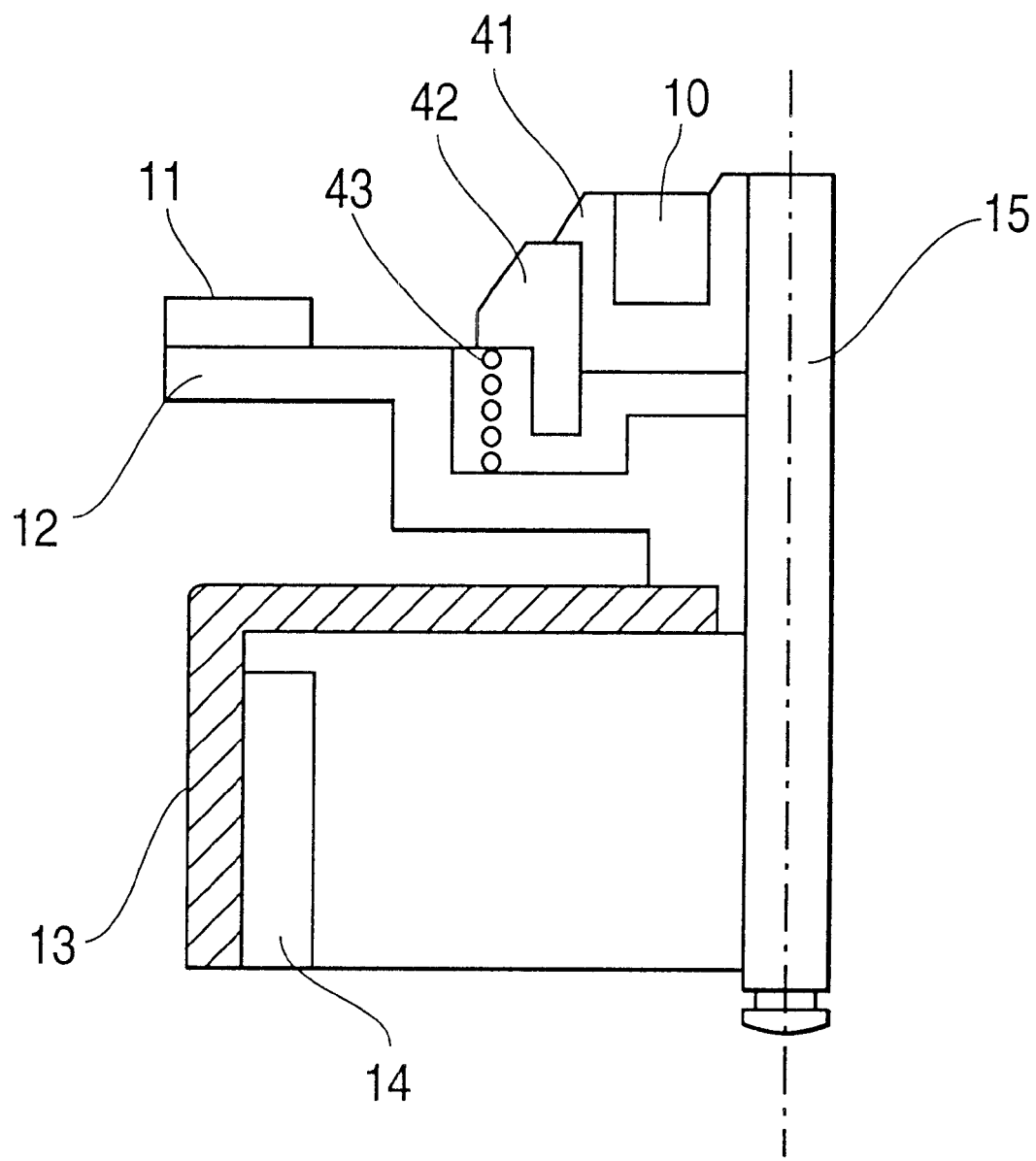
FIG. 7 is a cross sectional view of a rotor structure of a spindle motor for a CD-ROM drive in a prior art.

FIG. 6 illustrates a variant of the embodiment shown in FIG. 5, in which the rotor yoke 13 is integrated with the back yoke 30. Such a configuration will ensure a further curtailment in cost and a rational molding operation.

Referring back to FIG. 2, a stator assembly 16 comprises a stator yoke 17 insulated by electrodepositing and wound by a magnet wire to form a coil 18.

In order to rotatably support the shaft 15 serving as a rotational shaft of the rotor, a bearing 21 is caulked to a base 19 of a metal plate on which a drive circuit board 20 is disposed for constituting a motor drive circuit. The above-described stator assembly 16 is coaxially fixed to the outer periphery of the bearing 21, with the terminal end of the coil 18 being connected to the terminals on the drive circuit board 20 to complete the assembly of stator components. Then, the shaft 15 of the above-described rotor assembly 9 is inserted into the bearing 21 to assemble a spindle motor for an optical disk. Such configuration will achieve an improvement in performances of the motor without increasing dimensions of the motor and a reduction in the number of components and of assembling steps, as well as a relaxation of the precision of the components.

Although the present invention has been described by way of the above embodiments, it is to be appreciated that a variety of modifications and applications are possible within the scope and spirit of the present invention and are not intended to be excluded from the scope of the present invention.

Thus, according to the present invention there can be provided a high-performance spindle motor for an optical disk at low price, capable of improving the motor performances within the same motor space as the conventional one, of reducing the number of components and assembling steps and of relieving the mechanical precision of components.

What is claimed is:

1. A rotor structure for a spindle motor of an optical disc apparatus, comprising:

a turntable, formed to support an optical disk;

a chucking magnet positioned in a center of an upper side of the turntable, that is insert molded from a plastic material including magnetic particles;

a shaft, molded with the turntable;

a rotor yoke molded with the turntable and made from a soft magnetic metallic material, forming a cup-like shape which has a circular opening on a center of an underside of the rotor yoke and a portion turned up to form a back yoke in the center of the turntable; and a rotor magnet on an inner surface of the rotor yoke such that the shaft passes through the circular opening on the center of the underside of the rotor yoke, a part of the turntable is extended as far as an inner side of the rotor yoke, beyond an internal margin of a circular opening in the rotor yoke, to make contact with the rotor yoke, and the shaft, the chucking magnet and the rotor yoke form a single integrated piece.

2. The rotor structure according to claim 1, wherein a rare earth plastic magnetic material is used as the plastic material.

3. The rotor structure according to claim 1, wherein the turntable, the rotor magnet and the chucking magnet are formed from a plastic magnetic material using an insert molding, and the insert molded rotor yoke and back yoke form a single integrated structure.

4. A rotor structure for a spindle motor of an optical disc apparatus, having a turntable, a chucking magnet positioned in a center of an upper side of the turntable, a shaft molded with the turntable, a rotor yoke molded with the turntable and a rotor magnet on the rotor structure, comprising:

the rotor yoke being made from a soft magnetic metallic material forming a cup-like shape which has a circular opening on a center of an underside of the rotor yoke and a portion turned up to form a back yoke in the center of the turntable;

the chucking magnet being arranged on the turntable;

the rotor magnet being provided on a inner surface of the rotor yoke;

the shaft passing through the circular opening on the center of the underside of the rotor yoke;

the turntable being formed so as to support an optical disc, wherein a part of the turntable is extended as far as an inner side of the rotor yoke beyond an internal margin of the circular opening in the rotor yoke and makes contact with the rotor yoke, where the rotor magnet, the shaft and the chucking magnet are insert molded from a plastic material having magnetic particles; and a back yoke arranged near the chucking magnet and the circular opening on the center of the underside of the rotor yoke and turntable together forming a single integrated piece;

wherein the shaft, the chucking magnet and the rotor yoke form a single integrated piece.

5. The rotor structure according to claim 4, wherein a rare earth plastic magnetic material is used as the plastic material.

6. The rotor structure according to claim 4, wherein the turntable, the rotor magnet and the chucking magnet are formed from a plastic magnetic material using an insert molding, and the insert molded rotor yoke and back yoke form a single integrated structure.

7. A rotor structure for a spindle motor of an optical disc apparatus, having a turntable, a chucking magnet positioned in a center of an upper side of the turntable, a shaft molded with the turntable, a rotor yoke molded with the turntable and a rotor magnet on the rotor structure, comprising:

the rotor yoke being made from a soft magnetic metallic material forming a cup-like shape which has a circular opening on a center of an underside of the rotor yoke;

the chucking magnet being arranged on the turntable;

the rotor magnet being provided on an inner surface of the rotor yoke;

the shaft passing through the circular opening on the center of the underside of the rotor yoke;

the turntable being formed so as to support an optical disc, wherein a part of the turntable is extended as far as an inner side of the rotor yoke beyond an internal margin of the circular opening in the rotor yoke and makes contact with the rotor yoke, where the rotor magnet, the shaft and the chucking magnet are insert molded from a plastic material having magnetic particles; and a bent portion of the rotor yoke being integrated as a single piece with the rotor yoke being used as a back yoke, and the back yoke being arranged near the circular opening on the center of the underside of the rotor yoke, wherein the shaft, the chucking magnet and the rotor yoke form a single integrated piece.

8. The rotor structure according to claim 7, wherein a rare earth plastic magnetic material is used as the plastic material.

9. The rotor structure according to claim 7, wherein the turntable, the rotor magnet and the chucking magnet are formed from a plastic magnetic material using an insert molding, and the insert molded rotor yoke and back yoke form a single integrated structure.

* * * * *